United States Patent [19]

Suzuki

[11] Patent Number: 4,942,587
[45] Date of Patent: Jul. 17, 1990

[54] OPTICALLY PUMPED SOLID-STATE LASER OSCILLATOR

[75] Inventor: Makoto Suzuki, Nagoya, Japan

[73] Assignee: Brother Kogyo Kabushiki Kaisha, Aichi, Japan

[21] Appl. No.: 321,866

[22] Filed: Mar. 10, 1989

[30] Foreign Application Priority Data

Mar. 10, 1988 [JP] Japan .................. 63-56898

[51] Int. Cl.$^5$ .............................. H01S 3/091
[52] U.S. Cl. ........................ 372/71; 372/69; 372/70; 372/75
[58] Field of Search .............. 372/69, 71, 75, 33, 372/34, 70; 307/425

[56] References Cited

U.S. PATENT DOCUMENTS 4,791,631 12/1988 Baumert et al. .................. 372/75

Primary Examiner—William L. Sikes
Assistant Examiner—Georgia Y. Epps
Attorney, Agent, or Firm—Oliff & Berridge

[57] ABSTRACT

An optically pumped solid-state laser oscillating device which includes an optical resonator for outputting a laser beam of a predetermined wavelength. The optical resonator has a predetermined optical absorption band and is excited in response to a semiconductor laser beam having a wavelength falling within the optical absorption band. A plurality of excitation light sources are provided for emitting a plurality of semiconductor laser beams having different wavelengths and applying those laser beams to the optical resonator. At least one of the plurality of the semiconductor laser beams has a wavelength falling within the predetermined optical absorption band regardless of the change of an ambient temperature. Hence, a stable laser output is obtainable regardless of the change of the ambient temperature without need for employment of a complicated temperature controlling mechanism.

6 Claims, 2 Drawing Sheets

OPTICALLY PUMPED SOLID-STATE LASER OSCILLATOR

BACKGROUND OF THE INVENTION

The present invention relates to an optically pumped solid-state laser oscillator.

A solid-state laser oscillator using, for example, Nd:YAG (Neodymium:Yttrium Aluminium Garnet-;$Y_3Al_5O_2$) is excited by a light having a strength within a range of photo absorption band of the Nd:YAG crystal, such as a light emitted from a xenon lamp. Fluorescent light emitted from the crystal is resonated by a photo resonator, thereby taking place the laser oscillation. Recently, due to the increase of the output from a semiconductor laser device, it has become possible to effectively take out a laser beam while using an excitation light having a wavelength in the range of from 806 to 811 nm which fall within a range of an absorption wavelength of the crystal of the Nd:YAG laser.

However, as shown in FIG. 3 representing a relation between a wavelength of an excitation light and a light output, the Nd:YAG crystal which is easily accessible and frequently used is narrow in the absorption wavelength range, i,e, from 806 to 811 nm, and besides the commonly used high output semiconductor laser sources vary in wavelength depending upon the change of the environmental temperature by about 0.25 nm/deg. at an average, as evidenced in the graph shown in FIG. 4 representing a relation between a casing temperature and an oscillation wavelength. Therefore, in order to ensure the use of the solid-state laser oscillator under operating temperatures, it has been necessary that temperature compensation be carried out by a temperature control mechanism using, for example, a Peltier element. Although a Nd:$YVO_4$ or a Nd:BeL has been known as a solid-state laser substance which has a wider absorption band, such substances are not commonly used and hence expensive in cost.

SUMMARY OF THE INVENTION

The present invention has been made in light of the foregoing circumstances, and it is an object of the invention to provide an optically pumped solid-state laser oscillator in which a stable output is obtainable under a wide range of environmental temperatures without need for employing a temperature controlling mechanism.

In order to achieve the above and other objects, there is provided an optically pumped solid-state laser oscillating device comprising: an optical resonator for outputting a laser beam of a predetermined wavelength, the optical resonator having a predetermined optical absorption band and being excited in response to a light having a wavelength falling within the optical absorption band; and an excitation light source for emitting a plurality of semiconductor laser beams and applying the laser beams to the optical resonator, the plurality of semiconductor laser beams having wavelengths different from one another. At least one of the plurality of semiconductor laser beams has a wavelength falling within the predetermined optical absorption band.

In operation, when the semiconductor laser beam from the excitation light source is incident to the optical resonator, an active material in a crystal of the excitation light source is excited and a population inversion occurs. Fluorescent light emitted from the active material is resonated by a resonator, thereby performing a stimulated emission and thus. For example, a Nd:YAG crystal has an absorption band for absorbing an excitation light having a wavelength in the range of 806 to 811 nm, and the wavelength thereof is varied by about 0.25 nm/deg. when an environmental temperature around the semiconductor laser source is varied. The excitation light source emits a plurality of the semiconductor laser beams, so that even if the wavelengths of some of the semiconductor laser beams are out of the absorption band, at least one of the laser beam has a wavelength falling within the range of the absorption band. Hence, a stable output is obtained regardless of the change of the environmental temperature.

DESCRIPTION OF THE PREFERRED EMBODIMENTS

A preferred embodiment of the present invention will be described with reference to the accompanying drawings.

Figure 1:
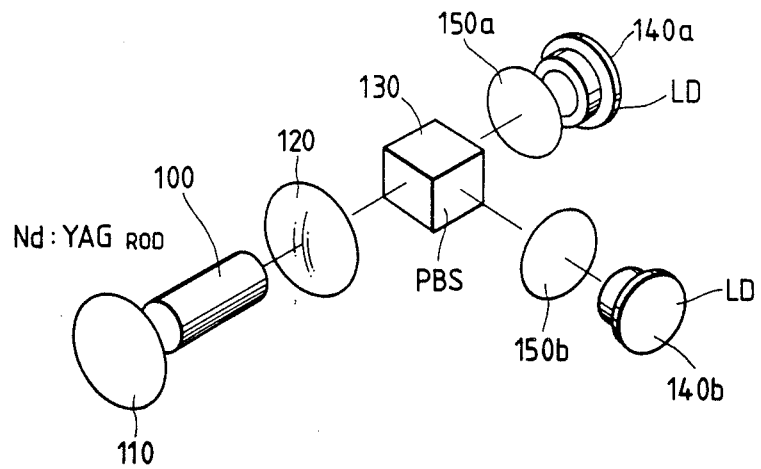
FIG. 1 is a perspective view showing an arrangement of an optically pumped solid-state laser oscillator according to one embodiment of the present invention.
Figure 2:
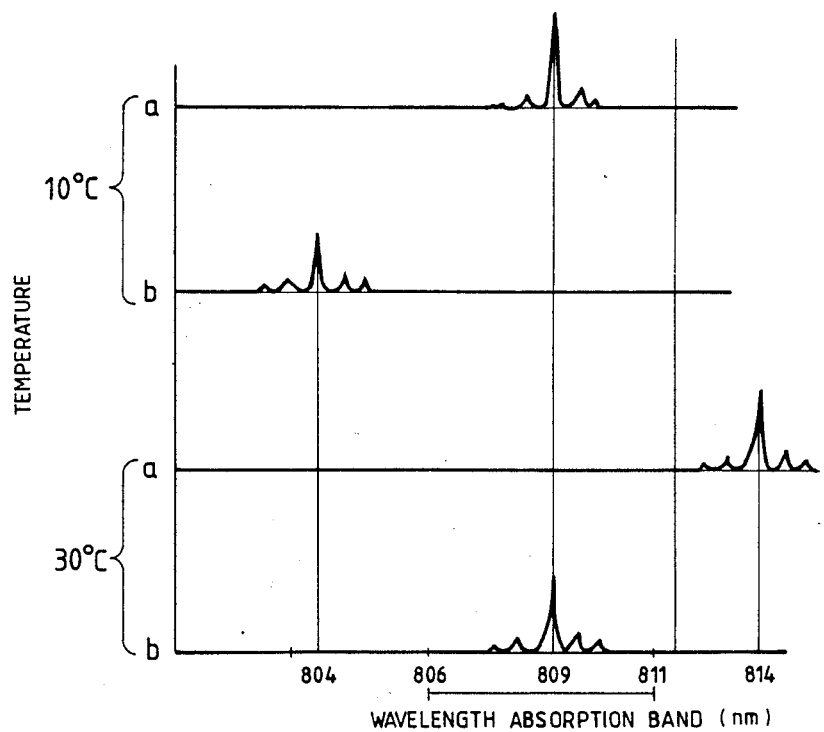
FIG. 2 is a graphical representation illustrating shifts in a wavelength of a semiconductor laser beam with respect to the change of an ambient temperature.
Figure 3:
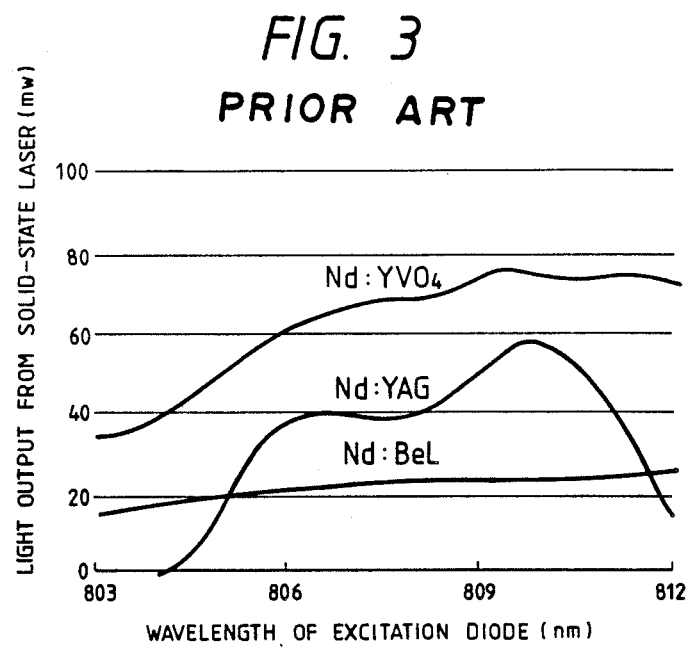
FIG. 3 is a graphical representation illustrating an absorption curve of a Nd:YAG crystal.
Figure 4:
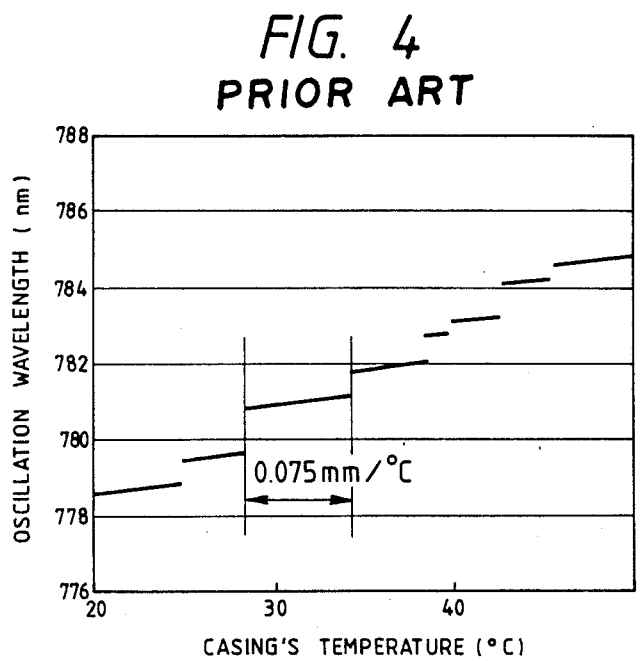
FIG. 4 is a graphical representation illustrating shifts in wavelength of a semiconductor laser beam with respect to the change of an ambient temperature.

Referring tO FIG. 1, two excitation light sources 140a and 140b are arranged at a right angle with respect to a deflection beam splitter 130. The light sources 140a and 140b emit semiconductor laser beams of different wavelengths from each other. Under an ambient temperature of 20° C., the light source 140a emits a semiconductor laser beam having a wavelength of 811.5 nm and the light source 140b emits a semiconductor laser beam having a wavelength of 806.5 nm. Those laser beams enter the deflection beam splitter 130. The laser beam from the light source 140a is allowed to transmit through the beam splitter 130 and the laser beam from the light source 140b is reflected at a right angle upon the beam splitter 130 and is directed toward a Nd:YAG rod member 100. Collimator lenses 150a and 150b are interposed between the light source 140a and the beam splitter 130 and between the light source 140b and the beam splitter 130, respectively, so that the laser beams from the light sources 140a and 140b are collimated. The Nd:YAG rod member 100 is made of a Nd:YAG crystal and is configured to a circular cylindrical shape. The Nd:YAG rod member 100 constitutes an optical resonator together with a resonant mirror 110 provided at one end of the Nd:YAG rod member 100. The end face of the Nd:YAG rod member 100 at the side of the resonant mirror 110 is transmissive of an oscillation wavelength of 1064 nm and the other end face thereof is transmissive of excitation wavelength in the range of 806 to 811 nm but is highly reflective of the wavelength of 1064 nm. The end face of the Nd:YAG rod member 100 at the side of the resonant mirror 110 is formed with an inwardly curved recess having a radius of curvature of approximately 100 nm. This end face of the Nd:YAG rod member 100 reflects 99% of the light having the 1064 nm oscillation wavelength and allows to transmit 1% thereof. Between the deflection beam splitter 130 and the Nd:YAG rod member 100, a convex lens 120 is arranged so that the collimated semiconductor laser beams may be focused and incident upon the Nd:YAG rod member.

In the laser oscillator arranged as above, the semiconductor laser beams from the light sources 140a and 140b are oscillated at the wavelengths of 809 nm and 804 nm, respectively, under the ambient temperature of 10° C. Each of these laser beams is shaped to a collimated beam by means of the associated collimator lens 150a or 150b and enters the deflection beam splitter 130 where these two laser beams are merged as one beam. The resultant beam is focused by the convex lens 120 and is then incident upon the Nd:YAG rod member 100. The semiconductor laser beam having a wavelength of 809 nm primarily contributes to the excitation, so that a laser oscillation is taken place between the end face of the Nd:YAG rod member 100 adjacent to the convex lens 120 and the resonant mirror 110. Under the ambient temperature of 30° C., the wavelengths of the semiconductor laser beams from the light sources 140a and 140b are changed to 814 nm and 809 nm, respectively. The laser beam having 814 nm wavelength hardly contributes to the excitation; however, by the laser beam of 809 nm wavelength the laser oscillation is taken place.

In the range of the ambient temperatures from 10° C. to 30° C., since at least one of the laser beams from the light sources 140a and 140b falls within an absorption band of the Nd:YAG rod member 100, the laser oscillation is ensured. Although description has been made with respect to the case where two light sources are employed, the number of the laser light sources may be increased so that at least one of the laser beams emitted therefrom falls within the range of the absorption band under a range of operating temperatures, whereby a uniform and stable output is obtainable regardless of the change of the ambient temperature. In addition, the laser beams having a plurality of different wavelengths may be emitted from a plurality of stripes of a single semiconductor laser source.

As described, according to the present invention, with a solid-state laser oscillator, a plurality of semiconductor laser beams having different wavelengths from one another are employed in which at least one of the laser beams has a wavelength falling within the range of the absorption band of the solid-state laser material. Therefore, a stable laser output is obtainable regardless of the change of the environmental temperature without need for employment of a complicated temperature controlling mechanism.

What is claimed is:

1. An optically pumped solid-state laser oscillating device comprising:
    an optical resonator for outputting a laser beam of a predetermined wavelength, said optical resonator having a predetermined optical absorption band and being excited in response to a light having a wavelength falling within said optical absorption band; and
    a plurality of excitation light sources for emitting a plurality of semiconductor laser beams and applying said laser beams to said optical resonator, said plurality of semiconductor laser beams having wavelengths different from one another.

2. A device as recited in claim 1, wherein said wavelengths of said plurality of semiconductor laser beams vary depending upon an ambient temperature and at least one of said plurality of semiconductor laser beams falls within said predetermined optical absorption band in a predetermined range of said ambient temperature.

3. A device as recited in claim 2, wherein said optical resonator comprises a resonant mirror and a solid-state rod member, said plurality of semiconductor laser beams being applied to said solid-state rod member and said laser beam of said predetermined wavelength being oscillated between said resonant mirror and said solid-state rod member.

4. A device as recited in claim 3, wherein said solid-state rod member is made of an Nd:YAG.

5. A device as recited in claim 4, further comprising a collimator lens interposed between said optical resonator and said excitation light source.

6. A device as recited in claim 5, further comprising a convex lens interposed between said collimator lens and said optical resonator.

* * * * *